(12) United States Patent
Chait et al.

(10) Patent No.: US 8,719,522 B1
(45) Date of Patent: May 6, 2014

(54) VIRTUAL DESKTOP BACKUP AND RESTORE

(75) Inventors: William J. Chait, Boulder, CO (US); Michael A. Glicksman, Boulder, CO (US); Steven M. Milek, Denver, CO (US)

(73) Assignee: EMC Corporation, Hopkinton, MA (US)

( * ) Notice: Subject to any disclaimer, the term of this patent is extended or adjusted under 35 U.S.C. 154(b) by 498 days.

(21) Appl. No.: 13/169,272

(22) Filed: Jun. 27, 2011

(51) Int. Cl.
*G06F 9/455* (2006.01)
(52) U.S. Cl.
CPC .................................... *G06F 9/455* (2013.01)
USPC ........................................ 711/162; 709/203
(58) Field of Classification Search
None
See application file for complete search history.

(56) References Cited

U.S. PATENT DOCUMENTS

| | | | |
|---|---|---|---|
| 2009/0144515 A1* | 6/2009 | Benari | 711/162 |
| 2009/0216975 A1* | 8/2009 | Halperin et al. | 711/162 |
| 2012/0131377 A1* | 5/2012 | Baird et al. | 714/4.11 |
| 2013/0249922 A1* | 9/2013 | Hachiya | 345/531 |

* cited by examiner

*Primary Examiner* — Kevin Verbrugge
(74) *Attorney, Agent, or Firm* — Van Pelt, Yi & James LLP

(57) ABSTRACT

Techniques to backup and restore virtual desktop data are disclosed. User data associated with a plurality of virtual desktop users is backed up at a central data storage location. A request is received from a requesting user to restore data associated with the requesting user's virtual desktop. Data associated with the requesting user's virtual desktop is retrieved from said user data as backed up at the central data storage location said. The retrieved data associated with the requesting user's virtual desktop is used to provide a response to the request to restore said data associated with the requesting user's virtual desktop.

20 Claims, 6 Drawing Sheets

VIRTUAL DESKTOP BACKUP AND RESTORE

BACKGROUND OF THE INVENTION

In a virtual desktop (DT) or laptop (LT) environment, a user's personal data and/or settings may be stored in a location other than a device used by the user to access and use the user's virtual DT/LT. For example, VMware™ View is a Virtual Desktop Infrastructure (VDI) product sold by VMware. In a VDI environment, all data is stored in a corporate data center, rather than on hundreds or thousands of personal computers (PCs). Traditional data protection products typically back up data at the source. In the case of "desktops", that's the PC. Desktop/Laptop (DT/LT) specific products are no different—they typically have a client agent for running the backups and providing a user interface for restores. Since, in a Virtual Desktop (VDI) environment and similar environments, all of the data is already in the datacenter, the most efficient model would be to back up the device(s) used to store the data. However, the way the data is stored typically is specific to the virtualization vendor, for example VMware in the case of VMware View, and is not intuitively associated with individual user's PCs.

It is currently possible to back up user data as stored at a datacenter (e.g., the "datastore" or other storage device used for the VMware View infrastructure and user data), but due to the way the data typically is formatted, the datacenter backup may only be useful for disaster recovery purposes, for example to restore the entire datacenter in the event of catastrophic loss. It is also possible to back up user data for virtual DT/LT's using traditional DT/LT agent based technology, but this requires running (potentially) thousands of backups, with the risk that not all clients will be online during the backup window. And the more virtual clients that exist in an enterprise, the more stress that places on both the backup window and the backup server infrastructure.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A hybrid approach that backs up virtual desktop user data in a central location, such as a datacenter, but also provides an end-user self-service restore interface and functionality, as in traditional DT/LT products, is disclosed. The disclosed approach takes advantage of the benefits of backing up user data for a plurality of virtual desktop users centrally (faster, requires no bandwidth, more secure, no impact on client productivity) while allowing end-users to restore their own data via end-user self-service restore (no IT intervention for restores, increased productivity due to instantaneous recoverability).

Figure 1:
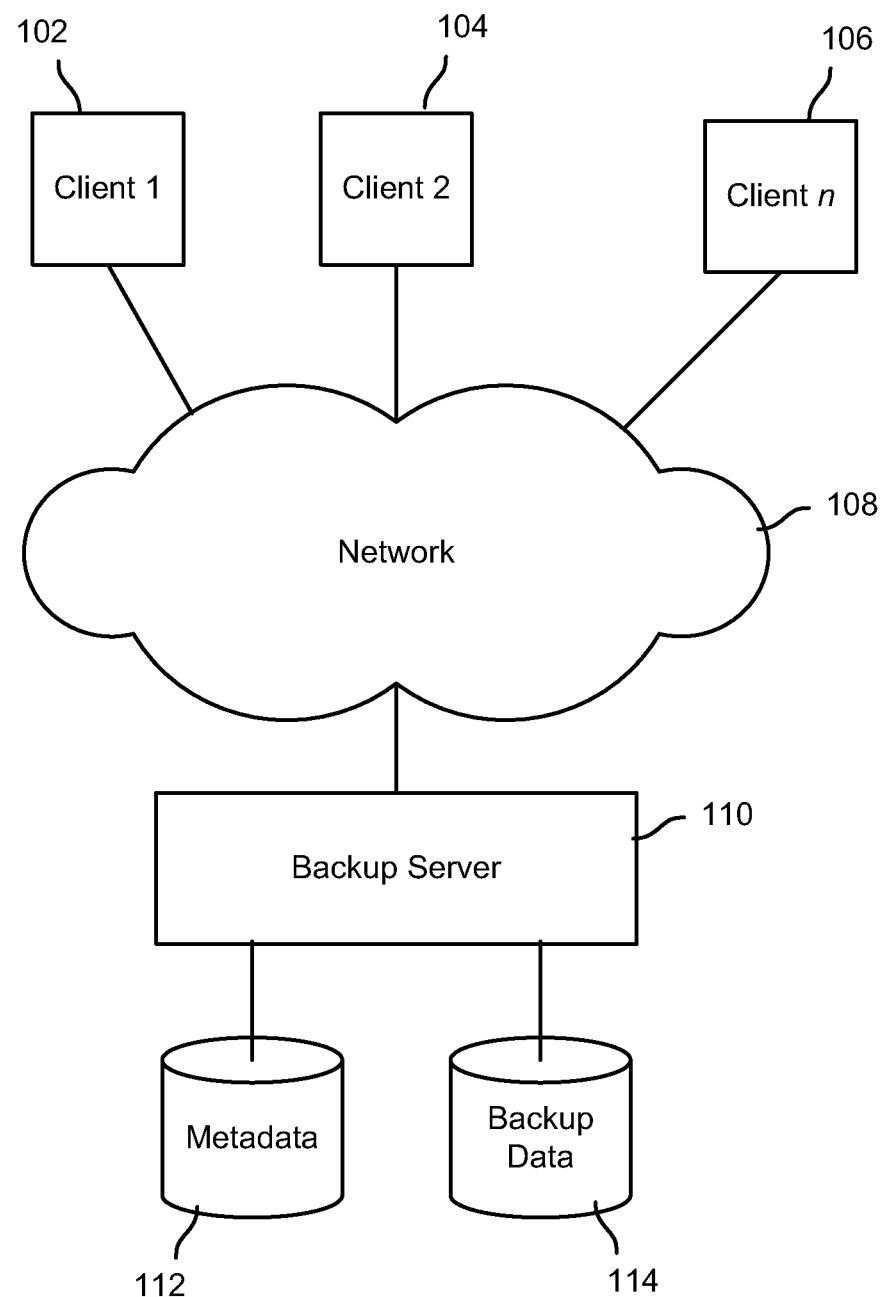
FIG. 1 is a block diagram illustrating an embodiment of a backup system and environment.

FIG. 1 is a block diagram illustrating an embodiment of a backup system and environment. In the example shown, a plurality of client systems 1 through n, represented in FIG. 1 by client systems 102, 104, and 106, are backed up over a network 108, such as one or more of the Internet, a local area network (LAN), a wide area network (WAN), and/or one or more other networks, such as an enterprise or other network, by interaction with a backup server 110. In the various embodiments, a backup client or other agent installed on each of the respective client systems interacts with the backup server 110 to backup client system data stored on the client system. In the example shown, the backup server 110 stores backed up data received over the network 108 in a backup data store 114 and stores metadata to keep track of the backup data, e.g., to which client each set of data belongs, in a metadata store 112, such as an index. In other embodiments, client system data may instead be backed up to another system, not shown, such as a network attached storage or other storage device or system, rather than being stored by the backup server as shown in FIG. 1.

In some environments, a client-based backup as shown in FIG. 1 may be used to backup a virtual desktop or other virtual client environment. As used herein, the term "virtual desktop" refers to any system in which virtualization techniques are used to provide a desktop, laptop, or other user device-like environment in which a user has access to the functionality of one or more applications, and associated application data associated with that user (such as the user's own documents or other application files), without having the application installed statically and running on an operating system installed statically on a particular client device or system. One example of such an environment is the VMware™ View offering described above. In VMware™ View, a corporate or other enterprise-wide "golden image" of an operating system and one or more applications is used to provide a plurality of virtual desktop instances, each having (through virtualization techniques) the functionality that would be available if a copy of the operating system and applications were installed statically on a client device. Instead, a lightweight virtualization client installed on any client device, potentially one of a plurality of devices used by a particular virtual desktop user, can be used by a user to access the user's virtual desktop. VMware™ View links the user's personal data to the user's virtual desktop instance, so each user has the same operating system and applications as all others who share the same base image but each also has that user's (and only that user's) personal data. Such personal data may include application data, such as files, and also configuration and other settings. To enable the virtual desktop to be accessed from any location and potentially any one of a plurality of devices, in some environments, such as VMware View, user data is stored persistently in a centralized data store, such as a corporate or other datacenter.

Figure 2:
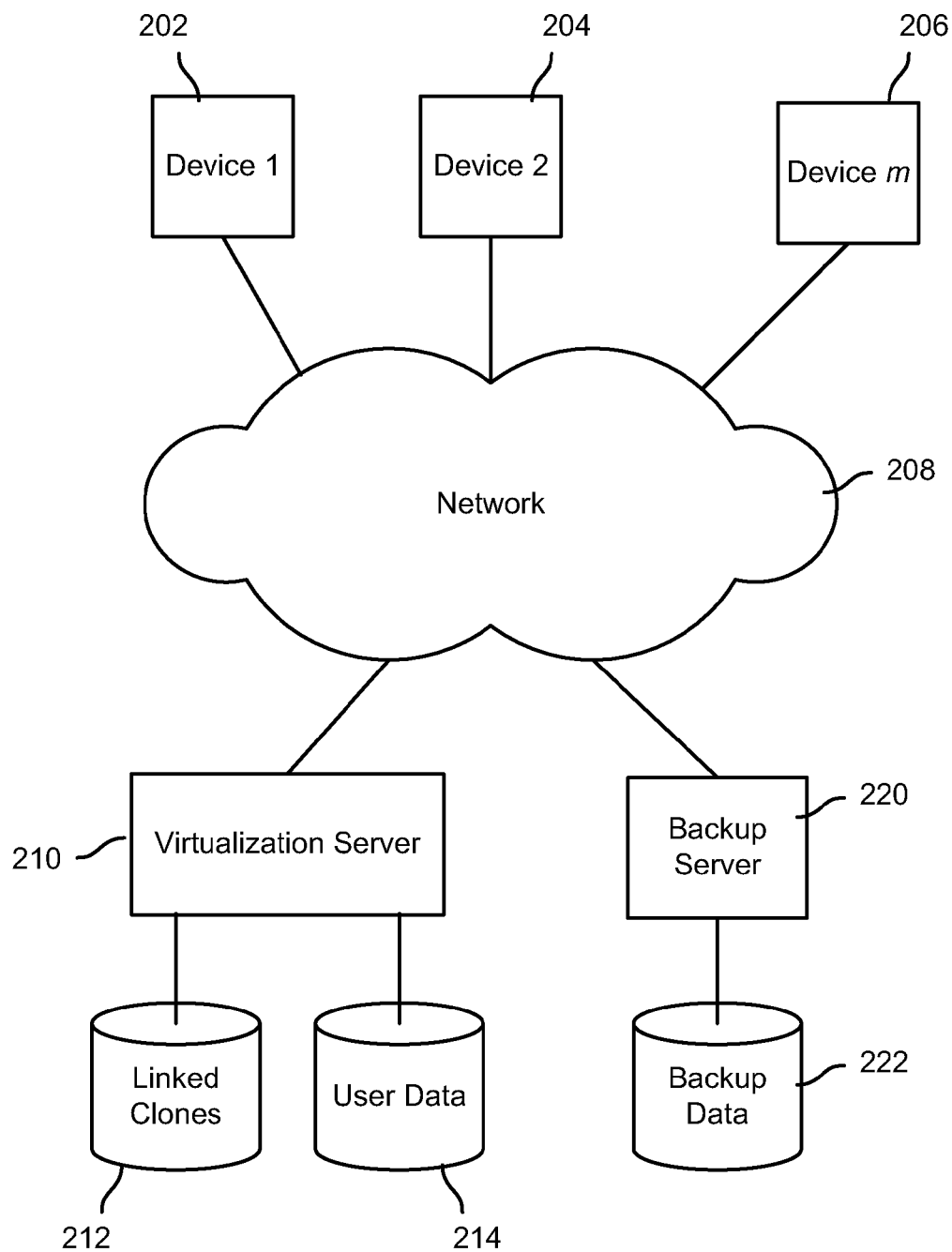
FIG. 2 is a block diagram illustrating an embodiment of a system configured to use a hybrid approach to backup and restore virtual desktop data.

FIG. 2 is a block diagram illustrating an embodiment of a system configured to use a hybrid approach to backup and restore virtual desktop data. In the example shown, one or more of a plurality of devices 1 through m, represented in FIG. 2 by devices 202, 204, and 206, may be used by each of a plurality of virtual desktop users (not shown) to access and use a virtual desktop associated with that user. At any given time, a virtual desktop user uses a selected device, which may be a desktop or laptop computer, a thin client computer, a phone or other mobile device, or any computing device running a virtualization client or other agent, to access via network 208 that user's virtual desktop. A virtualization server 210 accesses data associated with the user and stored in a linked clone store 212 to obtain (or instantiate) a user-associated clone of a golden image of an operating system and applications and associates the linked clone with the user's data as stored in a user data store 214 to provide to the user, via the device being used by the user to access the user's virtual desktop, a virtual desktop environment of that user. In the example shown in FIG. 2, a backup server 220 connected to network 208 is configured to back up user virtual desktop data by interacting not with the individual user devices 1 through m but instead at the datacenter or other data store 214 at which the user virtual desktop data is stored, for example a network attached storage (NAS) or other centralized data store. In some embodiments, a backup client at virtualization server 210 and/or on a system comprising and/or otherwise associated with data store 214 interacts with backup server 220 to store a backup copy of user virtual desktop data in backup data store 222.

In various embodiments, the backup server 220 and/or backup data store 222 are configured to store data on a de-duplicated basis. A client, agent, or other entity running on a system associated with user data 214 interacts with backup server 220 to send via network 208 for backup only data that has not already been stored in backup data store 222. In some embodiments, EMC Corporation's Avamar™ deduplication backup software and/or data storage and/or other components are used.

Referring further to FIG. 2, in various embodiments a data recovery client or other agent is installed, virtually or otherwise, for example virtually by including the recovery client or image in a virtual desktop environment, on a device being used by a virtual desktop user. The client or other agent is configured in various embodiments to interact with backup server 220 to provide to a virtual desktop user the ability to perform a self-service restore operation to restore that user's data, for example a user-selected data object, to a device being used by the user, based at least in part on that user's data as backed up at the data center or other central data storage location. In various embodiments, the client or agent is configured to obtain from the user, via a graphical user interface or other interface, one or more of a user identifier and a user credential, such as a password, and to provide the user identifier and/or credential to the backup server 220. The backup server uses the user identifier and/or credential to identify the user and the user's data, and to ensure only a user (or other authorized person, such as an administrator) gains access to the user's data as backed up at the data center or other central location, and that a (non-administrative) user only gains access to user data associated with that user.

Figure 3:
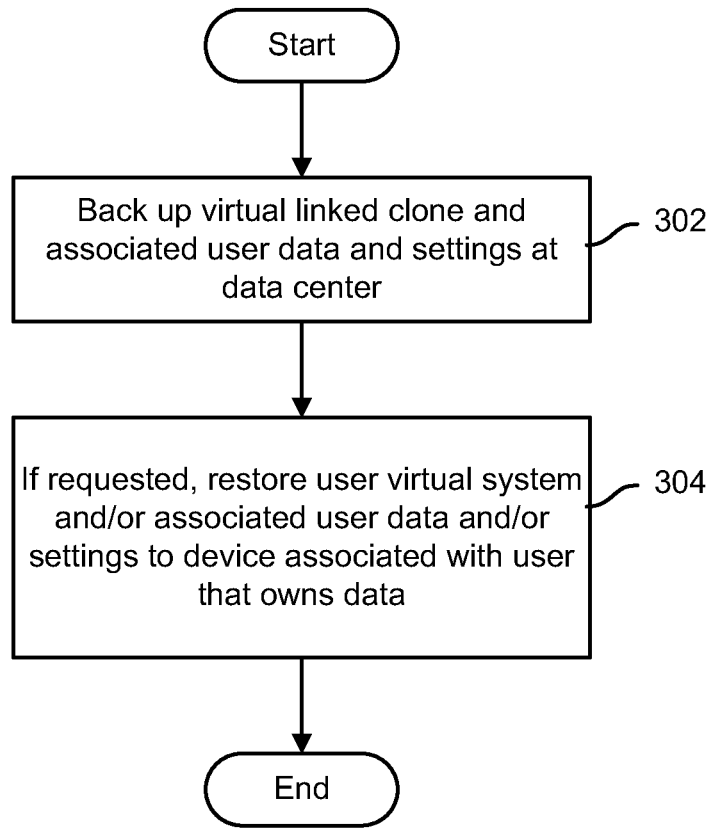
FIG. 3 is a flow diagram illustrating an embodiment of a process to back up and restore data.

FIG. 3 is a flow diagram illustrating an embodiment of a process to back up and restore data. In various embodiments, the process of FIG. 3 is implemented by a backup or other server, such as backup server 220 of FIG. 2. In the example shown, a backup of virtual desktop data is performed at a datacenter or other central data storage location (302). In various embodiments, the data backed up centrally includes virtual desktop data for a plurality of users. The data may include one or more of a linked clone of an operating system and/or application(s) and for each virtual desktop user, that user's personal data, including for example that user's application documents or other objects, configuration information, etc. If requested by a requesting virtual desktop user (or, in some embodiments, an authorized administrative user other than the virtual desktop user), the data backed up at the datacenter is used to restore the requesting user's virtual desktop-associated data to a user device associated with the requesting user (304).

Figure 4:
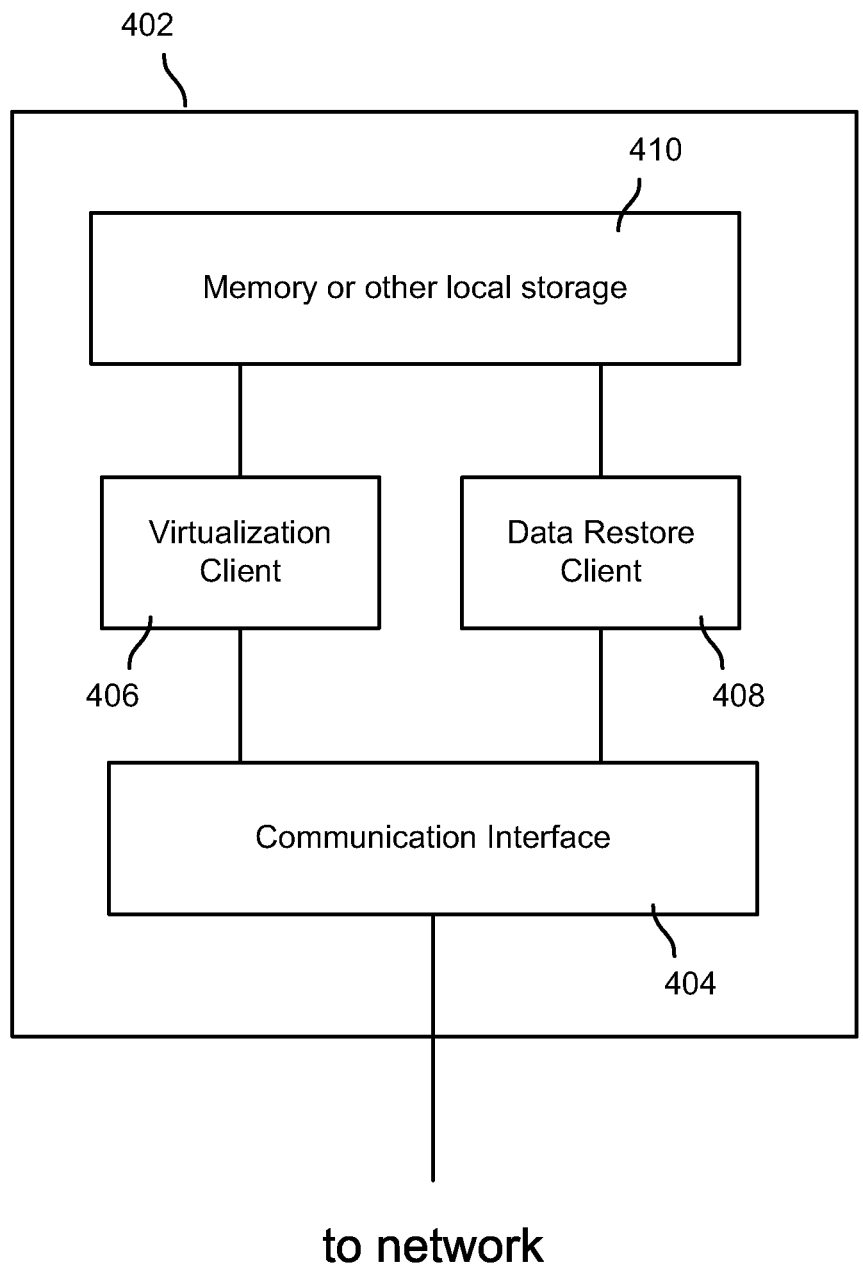
FIG. 4 is a block diagram illustrating an embodiment of a device configured to be used to access a virtual desktop environment.

FIG. 4 is a block diagram illustrating an embodiment of a device configured to be used to access a virtual desktop environment. In various embodiments, the device 402 may comprise a desktop, laptop, or other computer, a smart phone, a thin client device or system, or any system configured to provide access to a virtual desktop environment in a client-server or similar model, in which at least some data associated with a user's virtual desktop (or other virtual client) environment is stored in a central location remote from the user device 402. In some embodiments, the device 402 corresponds to one or more of the user devices 202, 204, and/or 206 of FIG. 2. In the example shown, the device 402 includes a communication interface 404, such as a network interface card (NIC) or other interface, configured to facilitate communication with remote devices via a network, such as network 208 of FIG. 2. A virtualization client 406 is installed and configured to interact with a remote server, such as virtualization server 210 of FIG. 2. The device 402 in the example shown has installed a data restore client 408, also configured to communicate using communication interface 404 with one or more remote components, such as backup server 220 of FIG. 2. In various embodiments, one or both of virtualization client 406 and restore client 408 comprises a software application running on an operating system and/or other execution environment provided using a processor (not shown) included in device 402. In the example shown, virtualization client 406 and restore client 408 are connected to a memory or other local storage 410 used by each to store locally data that must be stored locally to perform associated functions. For example, virtualization client 406 may store locally data used at any given point in time to provide virtual desktop functionality to a user of device 402.

User data associated with a user's virtual desktop environment is stored in various embodiments in a central location remote from device 402, for example in the data stores 212 and 214 of FIG. 2. In various embodiments, virtual desktop data associated with a plurality of users is backed up centrally at the data store, for example, using an EMC Avamar™ source-based de-duplication backup solution. Data restore client 408 installed on device 402 is configured in various embodiments to facilitate user self-serve restoration of all or part of the user's data associated with the user's virtual desktop. In some embodiments, data restore client 408 is configured to provide a graphical or other user interface configured to receive a user request to restore virtual desktop data. The data restore client 408 uses communication interface 404 to communicate the request to a remote backup server. In some embodiments, the data restore client 408 obtains from the user a user identification (e.g., username) and/or other identifying information and/or credential(s) (e.g., a password), and includes all or part of the identifying information in a restore request to the remote server. In some embodiments, the server extracts the requesting user's virtual desktop data from data backed up centrally at the datacenter and provides access to the requested user's virtual desktop data. In some embodiments, the server is configured to use the user identification and/or credential information to ensure that a requesting user gains access only to that requesting user's virtual desktop data. In some embodiments, the server provides to the user, via data restore client 408, a view of data objects available to be restored, for example a virtual file system or other view. The data restore client 408 is configured to present the view to the user and to receive and process user input indicating that the previously backed up virtual desktop data, or specified portions thereof, such as files, directories, and/or other objects indicated by the user through user input to data restore client 408 via an input device of the device 402 (not shown), are desired to be restored. In response to such an indication, the data restore client 408 communicates with the remote server to cause the requested data to be restored. In some embodiments, the data restore client 408 operates in a virtual desktop environment provided by virtualization client 406 and restoration results in the restored data being saved, centrally at the datacenter, along with other data associated with the user's virtual desktop.

Figure 5:
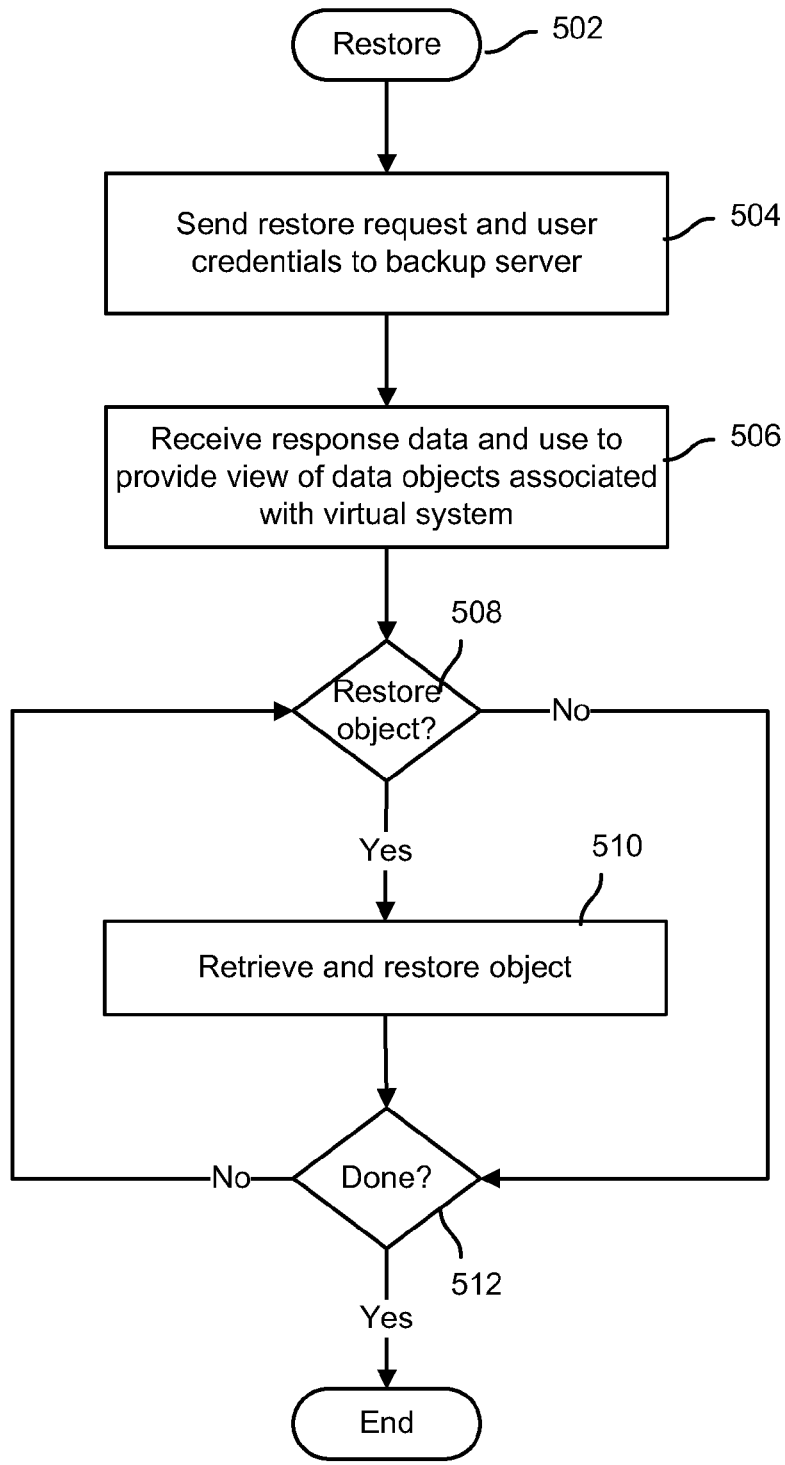
FIG. 5 is a flow diagram illustrating an embodiment of a process to restore virtual desktop data.

FIG. 5 is a flow diagram illustrating an embodiment of a process to restore virtual desktop data. In some embodiments, the process of FIG. 5 is implemented by a data restore client running on a user device, such as data restore client 408 of FIG. 4. Upon receiving at a user device (for example via a user input to a user interface) a request to restore virtual desktop data (502), a restore request and user identification and/or credential data are sent to a backup or other server (504). A response comprising response data is received from the server and used to provide to a user, via a display or other output device for example, a view of data objects, such as files or other application objects, associated with the user's virtual desktop (506). If a request to restore a specified object is received (508), the specified object is requested from the remote server and restored at the user device (510). The process continues until done (512), for example the data restore application is closed and/or the user device is powered down.

Figure 6:
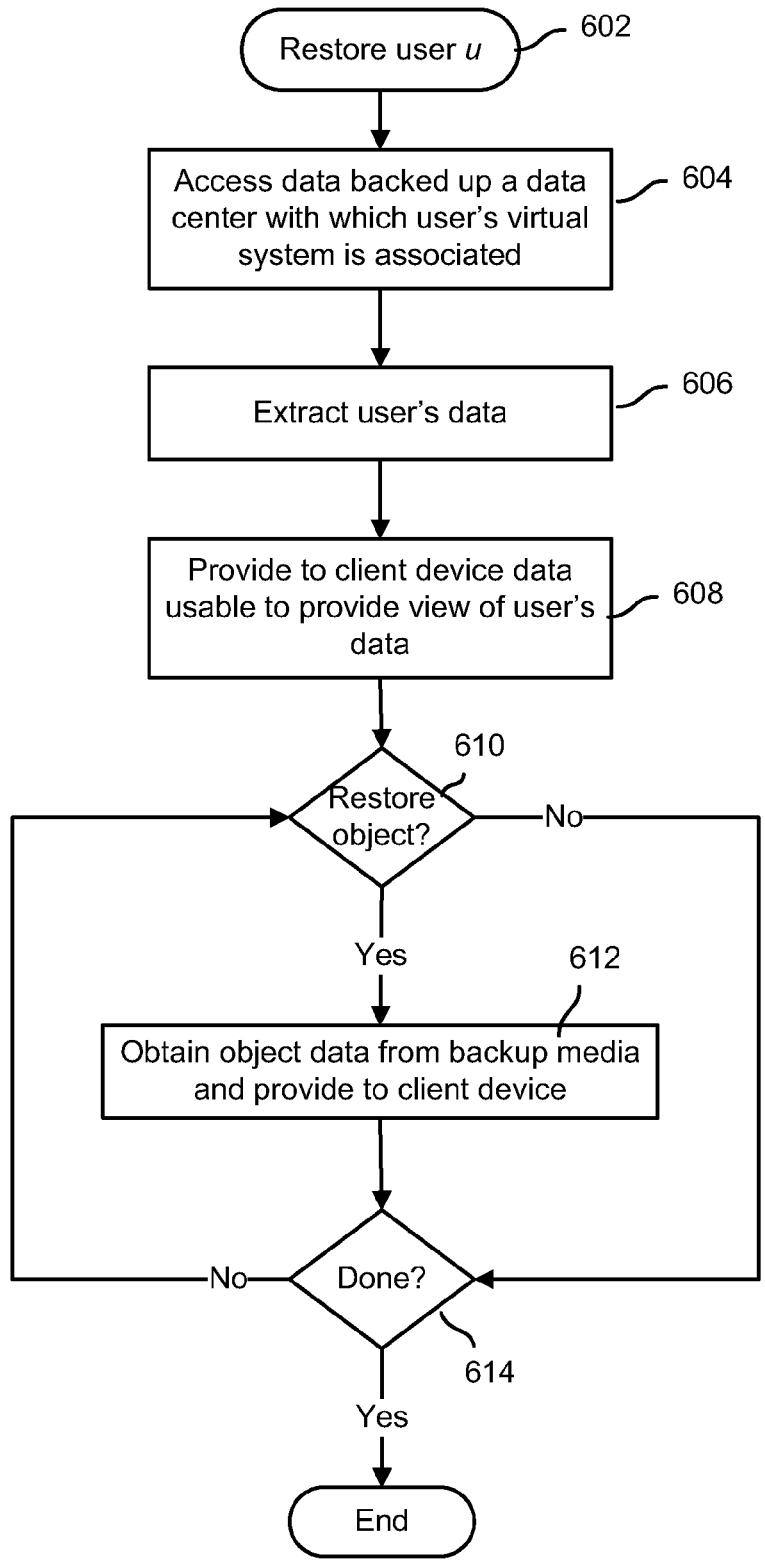
FIG. 6 is a flow diagram illustrating an embodiment of a process to restore virtual desktop data.

FIG. 6 is a flow diagram illustrating an embodiment of a process to restore virtual desktop data. In some embodiments, the process of FIG. 6 is implemented by a backup server, such as backup server 220 of FIG. 2, configured to back up at a central location virtual desktop data for a plurality of virtual desktop users. A request is received to restore virtual desktop data associated with a virtual desktop user "u" indicated in and/or otherwise associated with the request (602). Virtual desktop data backed up previously at a central storage location, such as a datacenter, the backed up data including virtual desktop data for the requesting user u and other users, is accessed (604). The requesting user's virtual desktop data is identified and extracted from the set of data backed up as stored at the datacenter (606). In some embodiments, an API or other interface of a virtualization vendor with which the requesting user's virtual desktop is associated, is invoked to identify and extract, from data backed up at a central location, a subset of the backed up data that is associated with the requesting user. In some embodiments, the backed up data is parsed to find virtual desktop user identifying information and use same to determine which portion(s) of the backed up data are associated with the requesting user. A response comprising data usable at a user device from which the restore request was received to provide a view of the requesting user's virtual desktop data (or a portion thereof) is composed and provided to the user device (608). If a request is received from the user device to restore a specified object or set of objects (e.g., a file or group of files, a directory, a database, etc.) (610), the data required to restore the specified object(s) is obtained from the virtual desktop data backed up as stored at the datacenter and is provided in a response sent to the user device (612). The process continues until done (614), for example the restore process ends and/or the backup server is powered down.

Using techniques described herein, virtual desktop data for a plurality of virtual desktop users can be backed up efficiently, from a central location, without regard to whether particular user devices and/or particular user virtual desktops are connected and/or active during any particular time, such as a preconfigured or other backup window. The same data backed up at the datacenter or other central location may be used to provide user self-serve data restoration, at any desired level of granularity, with the assurance that a user will only be able to restore or otherwise access that user's own virtual desktop data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting data, comprising:
   backing up at a central data storage location user data associated with a plurality of virtual desktop users;
   receiving from a requesting user a request to restore data associated with the requesting user's virtual desktop;
   retrieving from said user data as backed up at the central data storage location said data associated with the requesting user's virtual desktop; and
   using the retrieved data associated with the requesting user's virtual desktop to provide a response to the request to restore said data associated with the requesting user's virtual desktop.

2. The method of claim 1, wherein the requesting user comprises one of said plurality of virtual desktop users.

3. The method of claim 1, further comprising determining a portion of said user data as backed up at the central data storage location that is associated with the requesting user.

4. The method of claim 3, wherein determining the portion associated with the requesting user comprises parsing said user data as backed up at the central data storage location and identify said portion as being associated with said requesting user.

5. The method of claim 3, wherein determining the portion associated with the requesting user comprises invoking an API or other interface of a virtualization component with which the requesting user's virtual desktop is associated to identify a subset of the backed up data that is associated with the requesting user.

6. The method of claim 1, wherein the user data comprises personal user data.

7. The method of claim 1, wherein the user data comprises a configuration or other setting.

8. The method of claim 1, wherein the request is received from a user device.

9. The method of claim 8, wherein the user device comprises a device other than the central data storage location at which the user virtual desktop data was backed up.

10. The method of claim 8, wherein the request is generated by a client, agent, or other user device based code or entity running on the user device.

11. The method of claim 1, wherein the request includes an identifier associated with the requesting user.

12. The method of claim 1, wherein the request includes a credential associated with the requesting user.

13. The method of claim 1, wherein the response provides to a user device from which the request was received data usable to provide to the requesting user at the user device a view of one or more backed up data objects associated with the requesting user.

14. The method of claim 11, further comprising receiving from the requesting user a restore request to restore a specific backed up data object associated with the requesting user.

15. The method of claim 14, further comprising using the retrieved data associated with the requesting user's virtual desktop to restore the specific backed up data object.

16. A system configured to back up and restore virtual desktop data, comprising:
 a communication interface; and
 a processor coupled to the communication interface and configured to:
  back up at a central data storage location user data associated with a plurality of virtual desktop users;
  receive from a requesting user, via the communication interface, a request to restore data associated with the requesting user's virtual desktop;
  retrieve from said user data as backed up at the central data storage location said data associated with the requesting user's virtual desktop; and
  use the retrieved data associated with the requesting user's virtual desktop to provide, via the communication interface, a response to the request to restore said data associated with the requesting user's virtual desktop.

17. The system of claim 16, further comprising a data storage device coupled to the processor and configured to be used to store said backed up user data.

18. The system of claim 16, wherein the requesting user comprises one of said plurality of virtual desktop users.

19. The system of claim 16, wherein the processor is further configured to determine a portion of said user data as backed up at the central data storage location that is associated with the requesting user.

20. A computer program product for backing up and restoring virtual desktop data, the computer program product being embodied in a non-transitory computer readable storage medium and comprising computer instructions for:
 backing up at a central data storage location user data associated with a plurality of virtual desktop users;
 receiving from a requesting user a request to restore data associated with the requesting user's virtual desktop;
 retrieving from said user data as backed up at the central data storage location said data associated with the requesting user's virtual desktop; and
 using the retrieved data associated with the requesting user's virtual desktop to provide a response to the request to restore said data associated with the requesting user's virtual desktop.

* * * * *